(12) United States Patent
Dai et al.

(10) Patent No.: US 9,001,250 B2
(45) Date of Patent: Apr. 7, 2015

(54) METHOD AND APPARATUS FOR READING IMAGE DATA FROM AN IMAGE SENSOR

(71) Applicant: Omni Vision Technologies, Inc., Santa Clara, CA (US)

(72) Inventors: Tiejun Dai, Santa Clara, CA (US); Zheng Yang, San Jose, CA (US); Shijing Yao, Berkeley, CA (US)

(73) Assignee: Omni Vision Technologies, Inc., Santa Clara, CA (US)

( * ) Notice: Subject to any disclaimer, the term of this patent is extended or adjusted under 35 U.S.C. 154(b) by 22 days.

(21) Appl. No.: 14/024,123

(22) Filed: Sep. 11, 2013

(65) Prior Publication Data

US 2015/0070547 A1    Mar. 12, 2015

(51) Int. Cl.
*H04N 3/14* (2006.01)
*H04N 5/335* (2011.01)
*H04N 5/369* (2011.01)
*H04N 5/374* (2011.01)

(52) U.S. Cl.
CPC .............. *H04N 5/3696* (2013.01); *H04N 5/374* (2013.01)

(58) Field of Classification Search
CPC .............................. H04N 5/3696; H04N 5/374
USPC ...................................................... 348/294, 302
See application file for complete search history.

(56) References Cited

U.S. PATENT DOCUMENTS

| 6,181,375 | B1 | 1/2001 | Mitsui et al. |
| 8,081,247 | B2 | 12/2011 | Dai |
| 2002/0030751 | A1* | 3/2002 | Takane ........................ 348/222 |
| 2010/0013969 | A1* | 1/2010 | Ui ................................. 348/294 |
| 2011/0073751 | A1* | 3/2011 | Ogino et al. ............... 250/208.1 |
| 2013/0134295 | A1* | 5/2013 | Yan et al. ................... 250/208.1 |

* cited by examiner

*Primary Examiner* — Gevell Selby
(74) *Attorney, Agent, or Firm* — Blakely Sokoloff Taylor & Zafman LLP (57) ABSTRACT

A method of reading image data from an image sensor includes accumulating image charges in photosensitive elements of an array of pixel cells. The accumulated image charges are transferred to corresponding transistors in multi-phase transfer channels that are coupled to corresponding columns of the pixel array. Multi-phase transfer signals are generated. Each set of the multi-phase transfer signals includes a plurality of control signals that are out-of-phase with one another and are coupled to control respective transistors in the multi-phase transfer channels. The accumulated image charges from a first variable number of pixel cells of a selected column are output in response to the multi-phase transfer signals. The accumulated image charges from a second variable number of pixel cells of another selected column are output in response to the multi-phase transfer signals.

23 Claims, 9 Drawing Sheets

|    | C1 | C2 | C3 | C4 | C5 | C6 |
|----|----|----|----|----|----|----|
| R1 | T5 |    |    |    |    | T5 |
| R2 | T4 | T5 |    |    | T5 | T4 |
| R3 | T3 | T4 | T5 | T5 | T4 | T3 |
| R4 | T2 | T3 | T4 | T4 | T3 | T2 |
| R5 | T1 | T2 | T3 | T3 | T2 | T1 |

FIG. 8A

| T5 | T5 | T5 | T5 | T5 | T5 |
|----|----|----|----|----|----|
| T4 | T4 | T4 | T4 | T4 | T4 |

FIG. 8B

METHOD AND APPARATUS FOR READING IMAGE DATA FROM AN IMAGE SENSOR

BACKGROUND INFORMATION

1. Field of the Disclosure

The present invention relates generally to image sensors, and more specifically, the present invention is directed to reading image data from image sensors.

2. Background

Image sensors have become ubiquitous. They are widely used in digital still cameras, cellular phones, security cameras, as well as, medical, automobile, and other applications. The technologies used to manufacture image sensors, such as for example complementary metal-oxide-semiconductor (CMOS) image sensors or charged coupled device (CCD) image sensors, have continued to advance over time.

The image data that is read out from image sensors can be later processed using a vast variety of techniques. Some example processing that may occur on the image data read out from an image sensor may include distortion correction of a distorted image captured with a fish eye lens, or for example, Joint Photographics Experts Group (JPEG) compression of an image that is read out from the image sensor. Typically, image data is read out from a CMOS image sensor row by row. Once the image data has been read out and stored in a memory, processing of the image data is then performed. The amount of memory that is required to process these applications typically needs to be equivalent to the size of the entire pixel array. With the continuing miniaturization of image sensors, it is an advantage to decrease the amount of memory required.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Examples in accordance with the teaching of the present invention describe an example method and apparatus for reading image data from an image sensor. Typically, an entire row of image data is read out from a CMOS image sensor row by row. As will be discussed, a multi-phase transfer channel coupled to a CMOS pixel cell enables image data to be output from a variable number of pixel cells during one or more readout cycles from a column of the image sensor in accordance with the teachings of the present invention. In other words, less than the entire row of pixels may be output during one clock cycle, where the pixel that is output for each column may be selected to be stored or ignored. In one example, the number of pixel cells read out from each column in one clock cycle may be independent of the number of pixel cells read out from other columns in accordance with the teachings of the present invention.

For instance, as will be discussed in greater detail below, an example image sensing system includes an array of pixel cells arranged into a plurality of rows and a plurality of columns. A plurality of multi-phase transfer channels is coupled to the array of pixel cells such that each one of the plurality of multi-phase transfer channels is coupled to a respective one of the plurality of columns of the array of pixel cells. Readout circuitry is coupled to the plurality of multi-phase transfer channels to readout image data from the array of pixel cells. Column control circuitry is coupled to separately generate a plurality of sets of multi-phase transfer signals, which are coupled to the transistors in the corresponding multi-phase transfer channels. Image data from a variable number of pixel cells of a selected column are transferred transistor-to-transistor along the multi-phase transfer channel in response to the multi-phase signals and are output to the readout circuit in accordance with the teachings of the present invention.

As will be shown, in one example, the multi-phase transfer signals may be generated separately for each column. During one clock cycle, one or more columns may be selected to output one pixel charge in response to one cycle of the multi-phase transfer signals. Columns in which the multi-phase transfer signals are not asserted, will not output a pixel charge.

Figure 1:
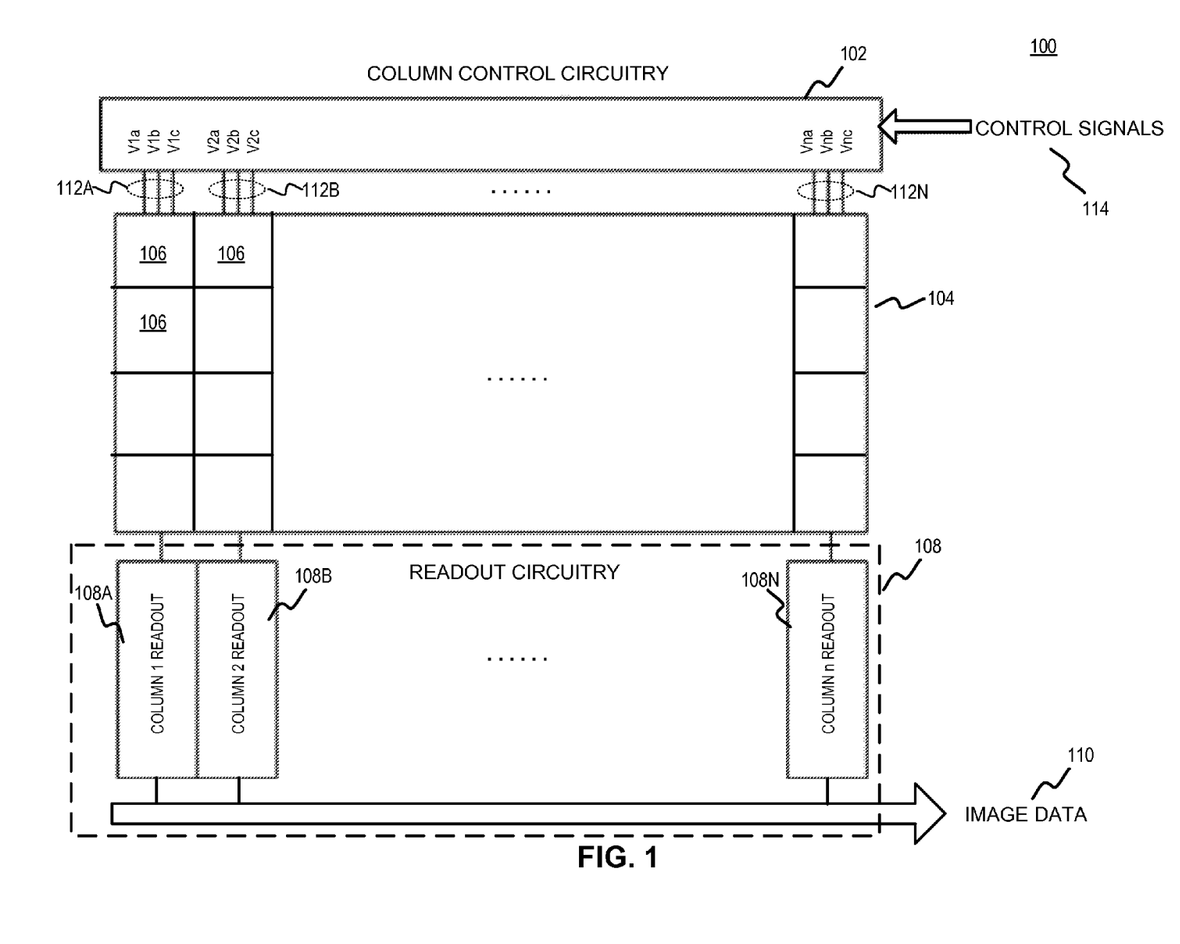
FIG. 1 is a diagram showing an example of a portion of an image sensing system in accordance with the teachings of the present invention.

To illustrate, FIG. 1 is a diagram showing a portion of an example image sensing system 100 in accordance with the teachings of the present invention. As shown in the depicted example, image sensing system 100 includes an array of pixels 104 that includes a plurality of pixels 106 arranged into a plurality of rows and a plurality of columns. In the depicted example, column control circuitry 102 is coupled to separately generate a plurality of sets of multi-phase transfer signals 112A, 112B, . . . , 112N, which in one example are coupled to be received by the array of pixels 104. In one example, multi-phase transfer channels are also coupled to receive a corresponding set of the multi-phase transfer signals 112A, 112B, . . . , 112N, to output image data from pixel cells 106 of the array of pixels 104 to readout circuitry 108. As shown in the depicted example, readout circuitry 108 includes a plurality of column readout circuits 108A, 108B, . . . , 108N, which are coupled to read out the image data output from a respective one of the plurality of columns of the array of pixels 104. In the illustrated example, the output generated by readout circuitry 108 is image data 110 as shown.

As shown in the example depicted in FIG. 1, column control circuitry 102 is coupled to separately generate a plurality of sets of multi-phase transfer signals 112A, 112B, . . . , 112N, in response to control signals 114. In one example, control signals 114 may be received from external control circuitry that is separate from column control circuitry 102. In one example, each set of multi-phase transfer signals 112A, 112B, . . . , 112N is coupled to independently control the output of image data from each column of the array of pixels 104. As such, image data from a variable number of pixel cells 106 can be output from each selected column of the array of pixels 104 in accordance with the teachings of the present invention. In other words, the variable number of pixel cells 106 that may be output in series from each column may be independent of a different variable number of pixel cells 106 that may be output in series from other columns in accordance with the teachings of the present invention.

It is appreciated that with the flexibility of being able to control the output of image data from each column separately, or independently of other columns, image data can be independently output in series from different variable numbers of pixel cells for each column of the array of pixels 104. As a result, a savings in memory may be achieved since entire rows or entire columns of image data are not required to be output at a time if only a portion of a row or column of image data is needed at any particular time.

For example, a distorted image taken with a fish eye lens has regions towards the corners of the array of pixels 104 in which no image data exists. Therefore, the image data of pixels towards the corners of the array of pixels 104 may be output and ignored, and less memory may be required to perform the fish eye lens distortion correction using image sensing system 100 in accordance with the teachings of the present invention.

Similarly, it is appreciated that when performing for example JPEG compression of the raw image data readout from the array of pixels 104, the image data can be readout for example in 8×8 micro blocks, or the like, directly from the array of pixels 104 without the limitation of having to readout an entire row or column of image data at a time from the array of pixels 104. As such, the JPEG compression can be achieved with less memory in accordance with the teachings of the present invention.

Figure 2:
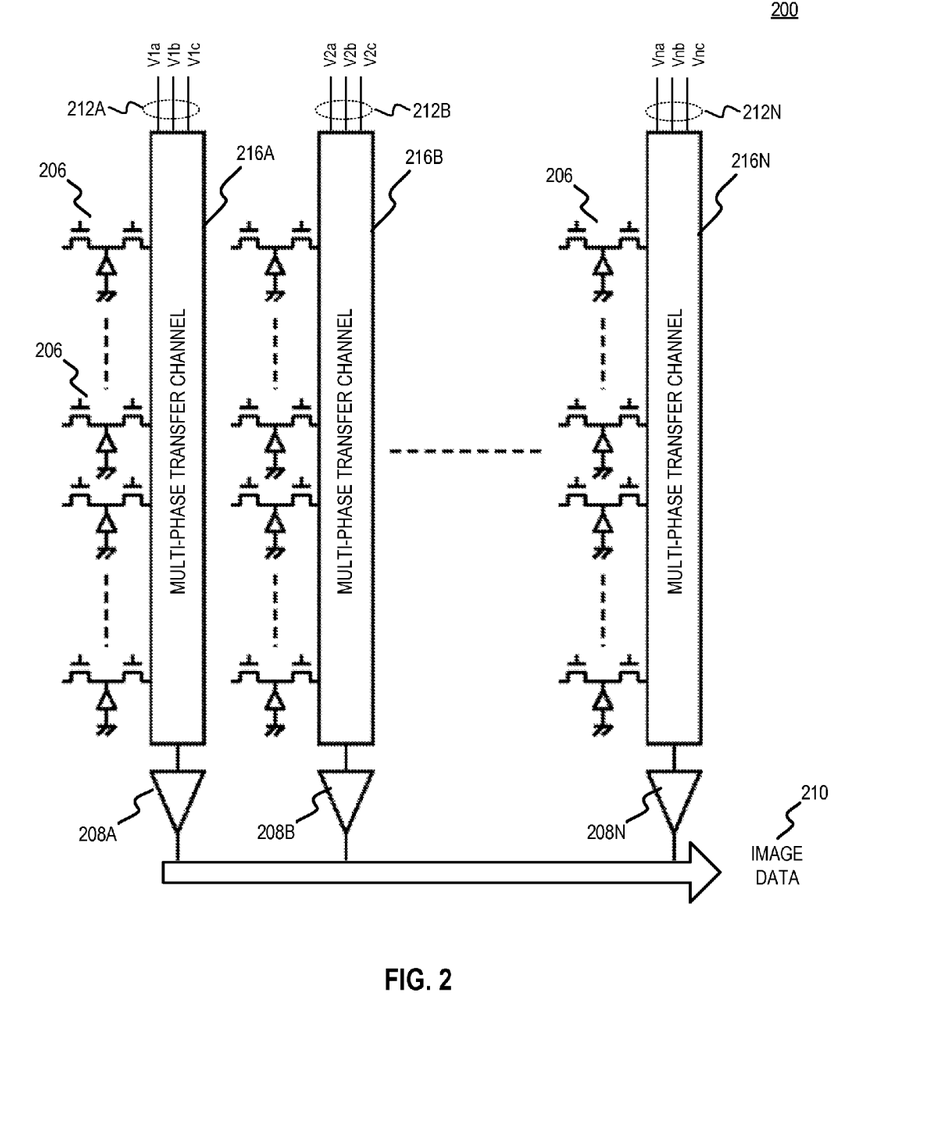
FIG. 2 is a diagram showing another example of a portion of an image sensing system in accordance with the teachings of the present invention.

FIG. 2 is a diagram showing another example of a portion of an image sensing system 200 in accordance with the teachings of the present invention. As shown in the depicted example, image sensing system 200 includes a plurality of pixels 206 arranged into a plurality of rows and a plurality of columns. In the depicted example, imaging system 200 also includes a plurality of multi-phase transfer channels 216A, 216B, . . . , 216N. Each one of the plurality of multi-phase transfer channels 216A, 216B, . . . , 216N is coupled to a respective column of pixels 206. Each one of the plurality of multi-phase transfer channels 216A, 216B, . . . , 216N is also coupled to receive respective set of multi-phase transfer signals 212A, 212B, . . . , 212N. In addition, the example in FIG. 2 illustrates that in one example, there is readout circuitry that includes a plurality of buffer circuits 208A, 208B, . . . , 208N, each of which is coupled to a respective one of the plurality of multi-phase transfer channels 216A, 216B, . . . , 216N. In one example, image data 210 is output from the plurality of buffer circuits 208A, 208B, . . . , 208N as shown. In one example, the plurality of buffer circuits 208A, 208B, . . . , 208N include amplifier circuits that are coupled to amplify signals that are responsive to image charges that are transferred from the plurality of buffer circuits 208A, 208B, . . . , 208N to generate the image data 210.

Figure 3:
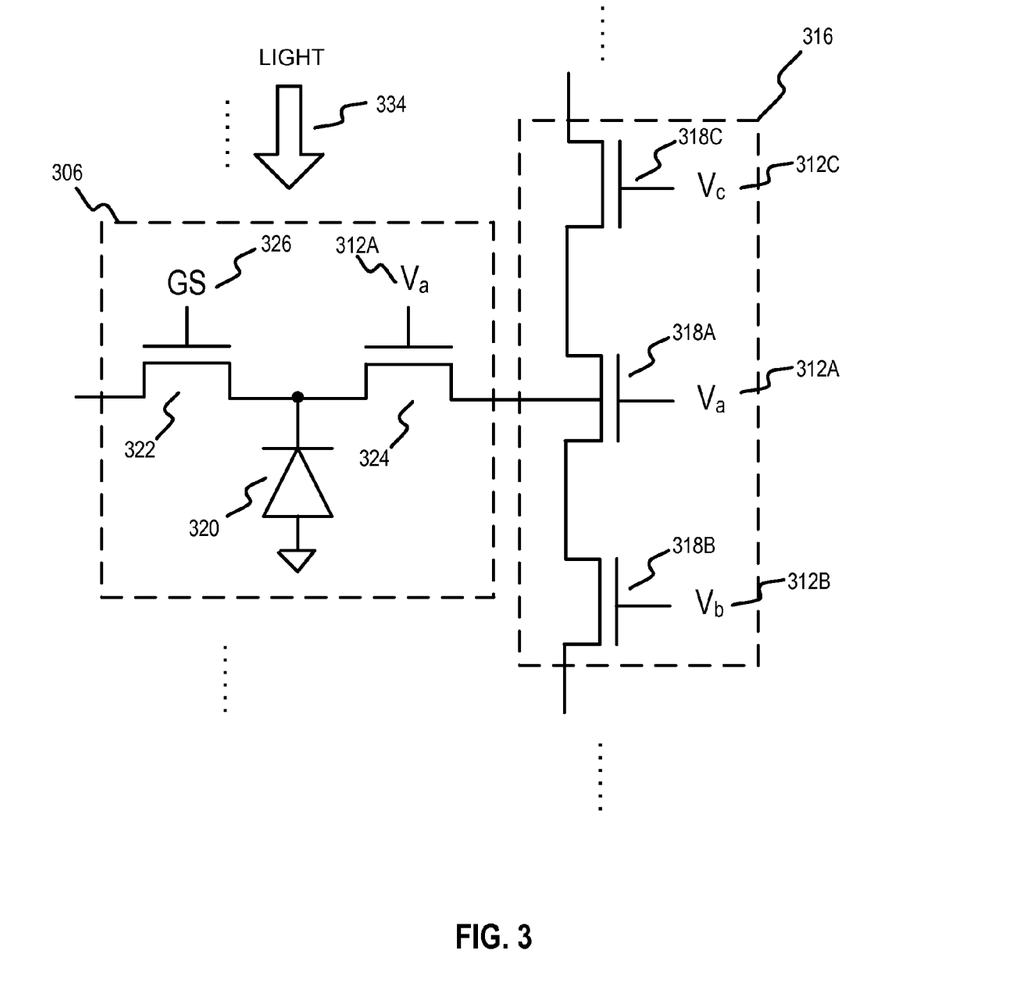
FIG. 3 is a schematic showing an example pixel cell coupled to a multi-phase transfer channel in accordance with the teachings of the present invention.

FIG. 3 is a schematic showing increased detail of an example pixel cell 306 coupled to a portion of a multi-phase transfer channel 316 in accordance with the teachings of the present invention. In one example, it is appreciated that pixel cell 306 is one of example of the pixel cells 106 of FIG. 1, or of pixel cells 206 of FIG. 2. Similarly, it is appreciated that the portion of multi-phase transfer channel 316 illustrated in FIG. 3 is one example of the portion of any one of the plurality of multi-phase transfer channel 216A, 216B, . . . , 216N of FIG. 2, and that multi-phase transfer signals Va 312A, Vb 312B, and Vc 312C are examples included in a set of multi-phase transfer signals 112A, 112B, and 112C of FIG. 1, or included in a set of multi-phase transfer signals 212A, 212B, and 212C of FIG. 2. Accordingly, it should be appreciated that similarly named and numbered elements referenced below are coupled and function as described above.

Referring back to the example depicted in FIG. 3, pixel cell 306 includes a photosensitive element 320 that is coupled to global shutter transistor 322 and a transfer transistor 324. The multi-phase transfer channel 316 includes a plurality of transistors coupled in series, including transistors 318A, 318B, and 318C, which are a portion of the plurality of transistors of multi-phase transfer channel 316. In the depicted example, transistors 318A, 318B, and 318C, are coupled to be controlled in response to multi-phase transfer signals Va 312A, Vb 312B, and Vc 312C, respectively, as shown.

In operation, light 334, which is representative of a portion of an image, is directed onto pixel cell 306. In one example, light 334 may be focused from a lens that is optically coupled to receive light 334 directed from an object that is being imaged with an image sensor in accordance with the teachings of the present invention. In the example, global shutter transistor 322 is coupled to receive a global shutter signal GS 326, which when activated causes photosensitive element 320 to accumulate image charge in response to light 334.

Assuming now that the image data from an image sensor including pixel cell 306 is to be output, transfer transistor 324 is then activated in response to transfer signal Va 312A, which causes in the image charge accumulated in photosensitive element 320 to be transferred through transistor 324 to transistor 318A of multi-phase transfer channel 316 as shown in FIG. 3. As mentioned above, in one example the transfer signal Va 312A is one of the plurality of multi-phase transfer signals 312A, 312B, and 312C that are coupled be received by the plurality of transistors 318A, 318B, and 318C, respectively, of multi-phase transfer channel 316 as shown.

As will be discussed in further detail, the plurality of multi-phase transfer signals 312A, 312B, and 312C, are out-of-phase with one another. As such, the plurality of transistors 318A, 318B, and 318C of multi-phase transfer channel 316 are controlled in response to the plurality of multi-phase transfer signals 312A, 312B, and 312C to transfer the accumulated image charge transistor-to-transistor along the series coupled plurality of transistors 318A, 318B, and 318C through multi-phase transfer channel 316 in accordance with the teachings of the present invention. For instance, the image charge stored in transistor 318A is transferred transistor-to-transistor to transistor 318B in response to multi-phase transfer signals 312A and 312B. In one example, the image charge may be stored in a potential well under the gate of the respective transistor. The image charge stored in transistor 318C is transferred transistor-to-transistor to transistor 318A in response to multi-phase transfer signals 312C and 312A. The image charge stored in transistor 318B is transferred transistor-to-transistor to a corresponding transistor of following row of the array of pixels in response to multi-phase transfer signals 312B and 312C. Similarly, the image charge stored in a corresponding transistor of a previous row of the array of pixels is transferred to transistor 318C in response to multi-phase transfer signals 312C and 312B.

In one example, the accumulated image charge from each pixel cell 306 of a column of the image sensor may be transferred through multi-phase transfer channel 316 for each complete cycle of a multiphase transfer signal. Thus, in one example a variable number of cycles of the multiphase transfer signals may be applied to each of the plurality of transistors of multi-phase transfer channel 316 to output the accumulated image charge from a variable number of pixel cells 306 for each column in accordance with the teachings of the present invention. In one example, the variable number may be greater than or equal to zero. In one example, the variable number of pixel cells output in series from one column may be independent of the variable number of pixel cells that are output in series from another column in accordance with the teachings of the present invention.

Figure 4:
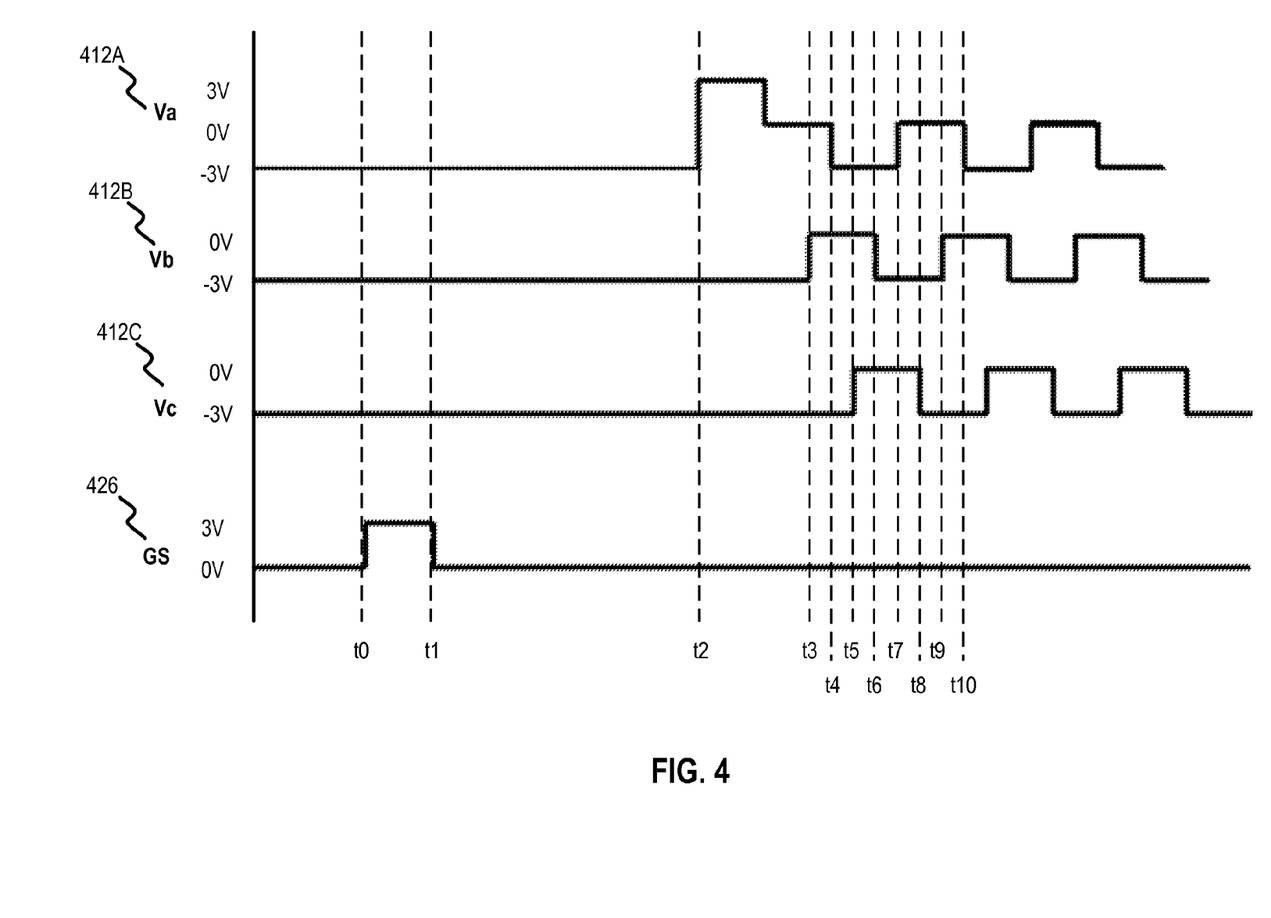
FIG. 4 is a timing diagram showing example multi-phase transfer signals and a global shutter signal in accordance with the teachings of the present invention.

FIG. 4 is a timing diagram showing example multi-phase transfer signals and a global shutter signal in accordance with the teachings of the present invention. In one example, it is appreciated that multi-phase transfer signals Va 412A, Vb 412B, and Vc 412C are examples of a set of multi-phase transfer signals 112A, 112B, and 112C of FIG. 1, or a set of multi-phase transfer signals 212A, 212B, and 212C of FIG. 2, or of multi-phase transfer signals Va 312A, Vb 312B, and Vc 312C of FIG. 3, that global shutter signal GS 426 is an example of global shutter signal GS 326 of FIG. 3. Accordingly, it should be appreciated that similarly named and numbered elements referenced below are coupled and function as described above.

Referring now back to the timing diagram example depicted in FIG. 4, global shutter signal GS 426 is activated between time t0 and t1. At this point, accumulation of image charge begins in the photosensitive element, such as for example photosensitive element 320 of FIG. 3. At time t2, the multi-phase transfer signal Va 412A is set to 3V, which in the depicted example results in the image charge that has been accumulated in photosensitive element 320 to be transferred through transfer transistor 324 to transistor 318A of the multi-phase transfer channel 316. In the example, it is noted that the multi-phase transfer signal Va 412A is set to 3V for all pixel cells in the pixel cell array so that the accumulated image charges for all of the pixel cells in the pixel array are transferred to corresponding transistors in the corresponding multi-phase transfer channels.

As can be observed in the example of FIG. 4, the multi-phase transfer signals Va 412A, Vb 412B, and Vc 412C are a plurality of control signals that are out-of-phase with one another and are coupled to control a plurality of transistors that are coupled together in a multi-phase transfer channel, such as for example multi-phase transfer channel 316 of FIG. 3. To illustrate, at time t3, multi-phase transfer signal Vb 412B is activated at time before multi-phase transfer signal Va 412A is deactivated at time t4. As a result, the accumulated image charge that was transferred to transistor 318A previously is transferred transistor-to-transistor from transistor 318A to transistor 318B during the time between t3 and t4. Similarly, at time t5, multi-phase transfer signal Vc 412C is activated at time before multi-phase transfer signal Vb 412B is deactivated at time t6. As a result, the accumulated image charge that was transferred to transistor 318B previously is transferred transistor-to-transistor from transistor 318B to a next transistor coupled to transistor 318B during the time between t5 and t6, which in the example is controlled in response to multi-phase transfer signal Vc 412C. In particular, referring back to the example of FIG. 3, it is appreciated that there is another transistor coupled in series to transistor 318C that is controlled in response to multi-phase transfer signal Vb 312B, and that there is another transistor coupled in series to transistor 318B that is controlled in response to multi-phase transfer signal Vc 312C.

Referring back the example shown in FIG. 4, the pattern for the multi-phase transfer signals Va 412A, Vb 412B, and Vc 412C continues similarly as described above at times t7, t8, t9, t10 and beyond, which results in the transfer of the accumulated image charges transistor-to-transistor along the multi-phase transfer channel, such as for example multi-phase transfer channel 316 of FIG. 3. In one example, the pattern continues for a variable number of clock cycles until the variable number of accumulated image charges are output from the multi-phase transfer channel to a corresponding readout circuit in accordance with the teachings of the present invention.

Figure 5A:
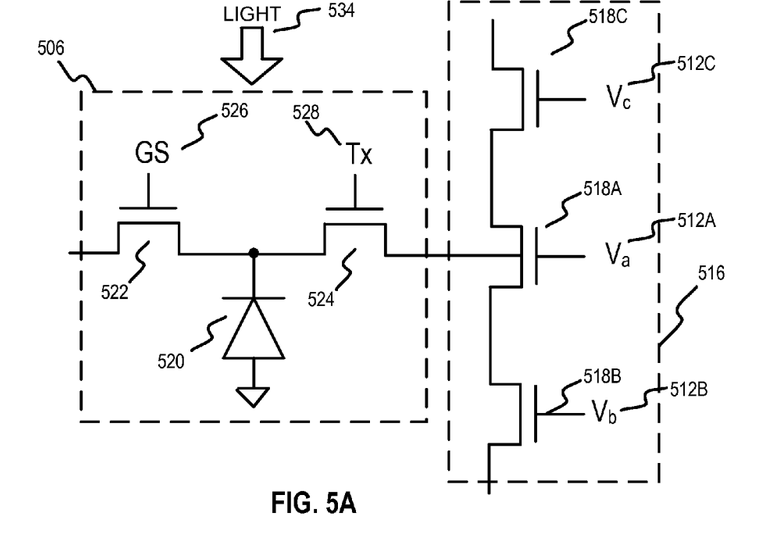
FIG. 5A is a schematic showing another example pixel cell coupled to a multi-phase transfer channel in accordance with the teachings of the present invention.

FIG. 5A is a schematic showing another example pixel cell 506 coupled to a portion of a multi-phase transfer channel 516 in accordance with the teachings of the present invention. It is appreciated that pixel cell 506 and that the portion of multi-phase transfer channel 516 illustrated in FIG. 5A share many similarities with pixel cell 306 and the portion of multi-phase transfer channel 316 illustrated in FIG. 3. Accordingly, it should be appreciated that similarly named and numbered elements referenced below are coupled and function as described above.

One difference between pixel cell 506 of FIG. 5A and pixel cell 306 of FIG. 3 is that pixel cell 506 of FIG. 5A includes a transfer transistor 524 coupled between photosensitive element 520 and transistor 518A of multi-phase transfer channel 516 that is controlled in response to a transfer signal Tx 528 instead of multi-phase transfer signal Va 512A. As a result, the transfer of the accumulated image charge from photosensitive element 520 to transistor 518A of multi-phase transfer channel 516 may be independent of multi-phase transfer signal Va 512A in the embodiment depicted in FIG. 5A.

Figure 5B:
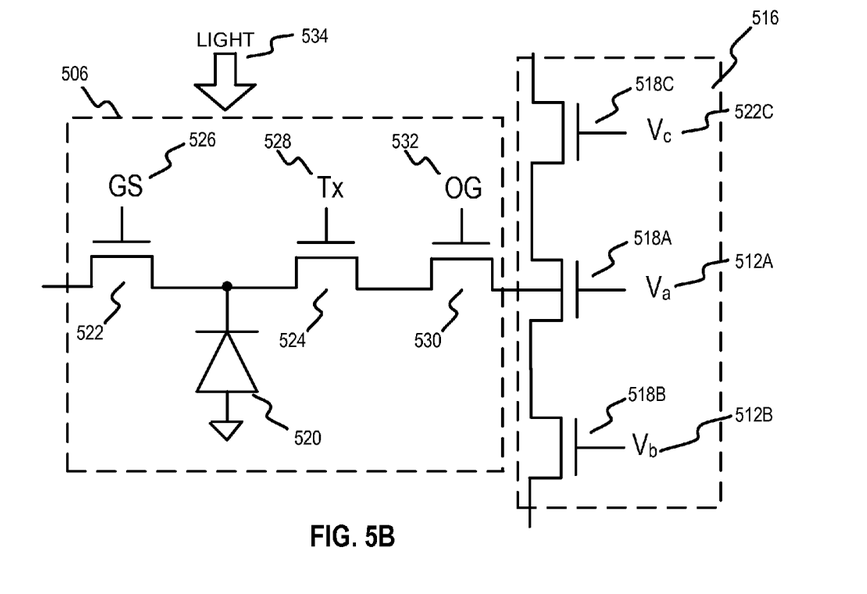
FIG. 5B is a schematic showing yet another example pixel cell coupled to a multi-phase transfer channel in accordance with the teachings of the present invention.

FIG. 5B is a schematic showing yet another example pixel cell 506 coupled to a multi-phase transfer channel 516 in accordance with the teachings of the present invention. It is appreciated that pixel cell 506 and that the portion of multi-phase transfer channel 516 illustrated in FIG. 5B share many similarities with pixel cell 506 and the portion of multi-phase transfer channel 516 illustrated in FIG. 5A, and with pixel cell 306 and the portion of multi-phase transfer channel 316 illustrated in FIG. 3. Accordingly, it should be appreciated that similarly named and numbered elements referenced below are coupled and function as described above.

One difference between pixel cell 506 of FIG. 5B and pixel cell 506 of FIG. 5A is that pixel cell 506 of FIG. 5B includes an additional output transistor 530 coupled between transfer transistor 524 and transistor 518A of multi-phase transfer channel 516. In the example depicted FIG. 5B, the output transistor 530 is controlled in response to an output gate signal OG 532. As a result, the transfer of the accumulated image charge from pixel cell 506 to transistor 518A of multi-phase transfer channel 516 is performed in further response to the activation of output gate signal OG 532 in the example depicted in FIG. 5B.

Figure 5C:
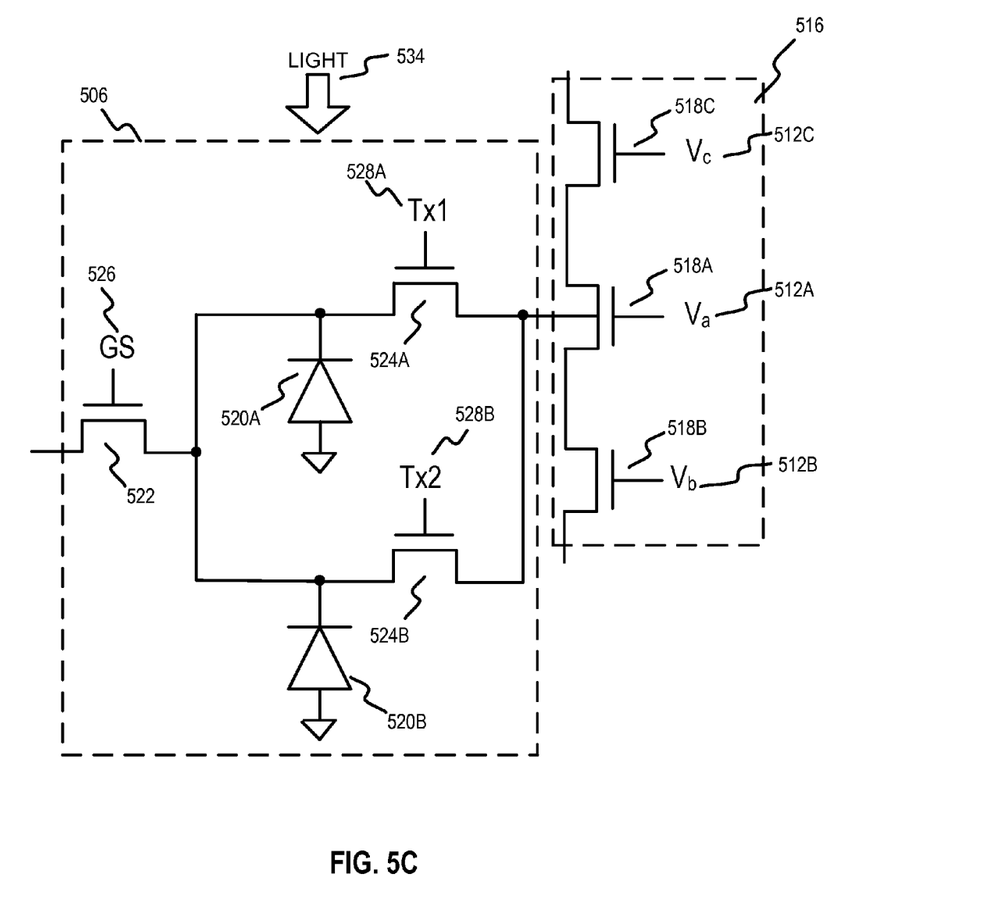
FIG. 5C is a schematic showing still another example pixel cell coupled to a multi-phase transfer channel in accordance with the teachings of the present invention.

FIG. 5C is a schematic showing still another example pixel cell 506 coupled to a portion of the multi-phase transfer channel 516 in accordance with the teachings of the present invention. It is appreciated that pixel cell 506 and the portion of multi-phase transfer channel 516 illustrated in FIG. 5C share many similarities with pixel cell 506 and the portion of multi-phase transfer channel 516 illustrated in FIG. 5A. Accordingly, it should be appreciated that similarly named and numbered elements referenced below are coupled and function as described above.

One difference between pixel cell 506 of FIG. 5C and pixel cell 506 of FIG. 5A is that pixel cell 506 of FIG. 5C includes a plurality of photosensitive elements 520A and 520B, and a plurality of transfer transistors 524A and 524B as shown. Thus, in the illustrated example, it is appreciated that each of the plurality of photosensitive elements 520A and 520B are included in a shared architecture in which both photosensitive elements 520A and 520B are coupled to transistor 518A of multi-phase transfer channel 516 through transfer transistors 524A and 524B, respectively. In the depicted example, transfer transistors 524A and 524B are controlled in response to transfer signals Tx1 528A and Tx2 528B, respectively. In one example, the plurality of photosensitive elements 520A and 520B may, for example, be utilized in combination to realize an architecture for pixel cell 506 with increased sensitivity and/or increased dynamic range in accordance with the teachings of the present invention.

Figure 6:
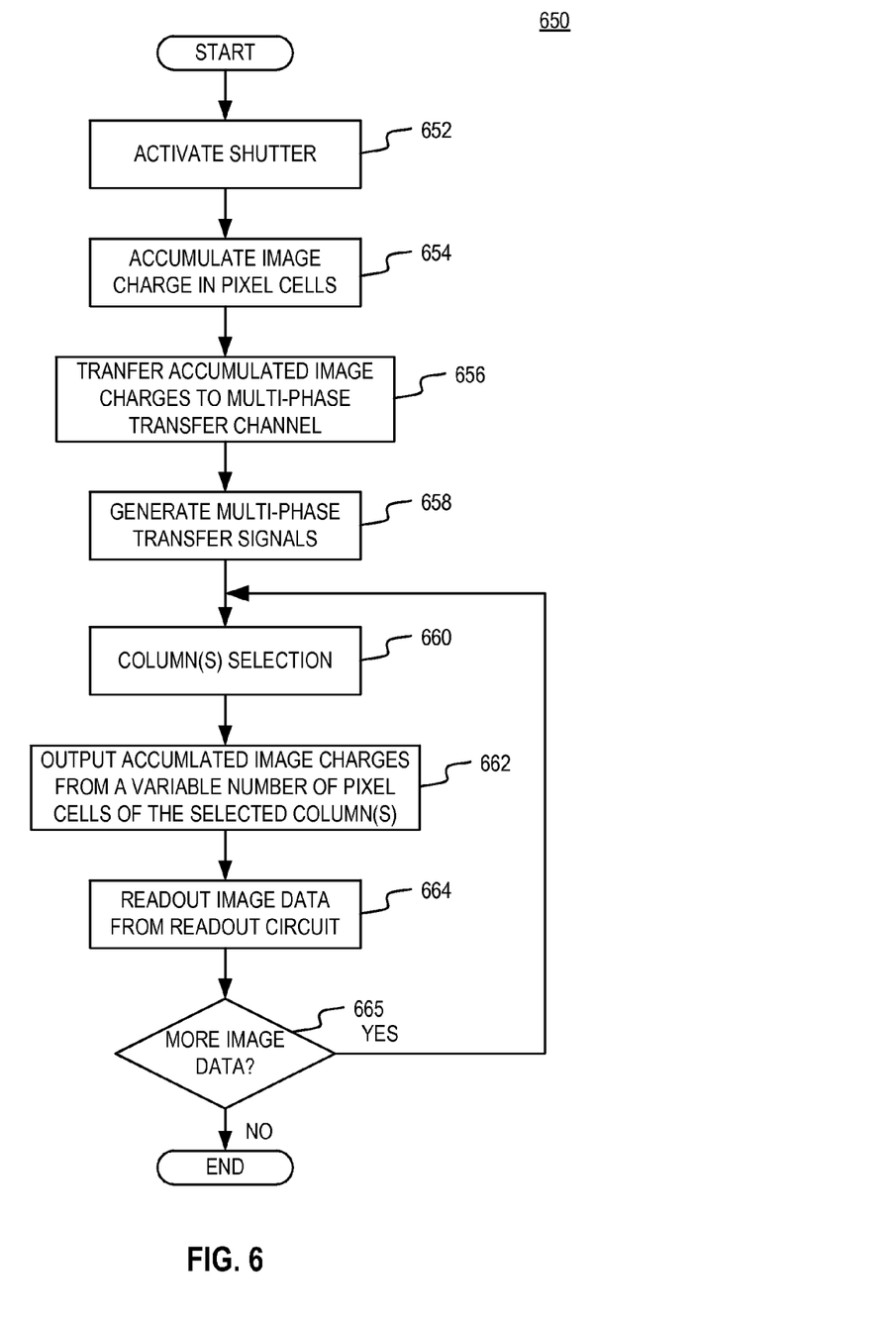
FIG. 6 is flow diagram showing an example method of reading image data from an image sensor in accordance with the teachings of the present invention.

FIG. 6 is flow diagram showing an example process 650 of reading image data from an image sensor in accordance with the teachings of the present invention. It is appreciated that appreciated that the process illustrated in FIG. 6 may refer to structures and/or functions described above with respect to FIGS. 1-5C. Accordingly, it should be appreciated that similarly named and numbered elements referenced below are coupled and function as described above.

As shown in the depicted example, process 650 begins with process block 652 at which time a shutter is activated. In one example, the shutter may be a global shutter. Process block 654 shows that image charge is then accumulated in the pixel cells of the image sensor. In one example, the pixel cells may be included in an array of pixels that are arranged into a plurality of rows and a plurality of columns. Process block 656 shows that accumulated image charges are then transferred to the multi-phase transfer channel.

Process block 658 shows that multi-phase transfer signals are generated. Process block 660 shows that one or more columns may then be selected. In one example, the selected column may be selected independent of a previously selected column. In another example, the selected column may be a next column in a sequence of columns. Process block 662 shows that the accumulated image charges of a variable number of pixel cells of the selected column may then be output. In one example, the accumulated image charges of the variable number of pixel cells is output in series from the selected column in response to the multi-phase transfer signals. In one example, the accumulated image charges are output in series by being transferred transistor- to-transistor along the multi-phase transfer channel until the variable number of image charges are output a readout circuit in response to the multi-phase transfer signals. Process block 664 shows that the image data is read out from a readout circuit.

Decision block 665 shows that if there is more image data to be read, the processing loops back to process block 660 such that another one or more columns may be selected. As mentioned previously, the next selected column may be selected independent of a previously selected column. In another example, the selected column may be a next column in a sequence of columns. In addition, it is appreciated that the variable number of pixel cells that are output from the next selected column in processing block 662 may be the same as the previous variable number of pixel cells that are output from the previously selected column. In another example, it is appreciated that the variable number of pixel cells that are output from the next selected column in processing block 662 may be different than the previous variable number of pixel cells that are output from the previously selected column.

It is appreciated of course that the order in which the process blocks are described above may not necessarily occur in same sequence as described and that some of the process blocks may occur simultaneously in accordance with the teachings of the present invention.

Figure 7A:
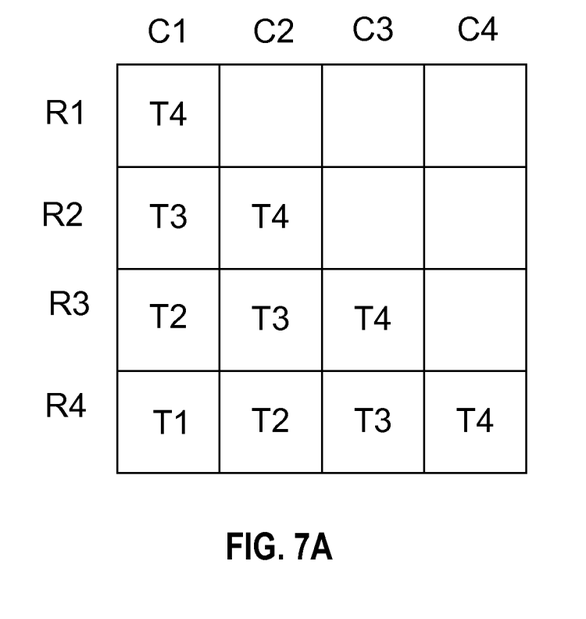
FIG. 7A is a diagram showing an example of a plurality of pixel cells included in an array of pixel cells that are to be rotated using read out techniques in accordance with the teachings of the present invention.
Figure 7B:
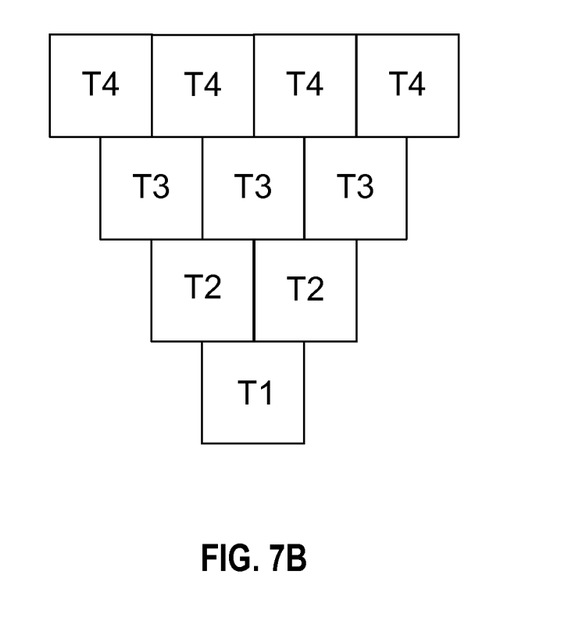
FIG. 7B is a diagram showing an example of a resultant image resulting from a plurality of pixel cells included in an array of pixel cells that are to be rotated using read out techniques in accordance with the teachings of the present invention.

The method of reading image data from an image sensor in accordance with the teachings of the present invention may be used for a variety of applications including image-processing applications, such as image rotation. To illustrate, FIG. 7A is a diagram showing an example of a plurality of pixel cells 700. Pixel cells 700 represents a part of the array of pixels in image sensing system 100 of FIG. 1, and is arranged in columns C1 thru C4 and rows R1 through R4. During a first complete cycle of the multiphase transfer signal, which may also be referred to as a readout cycle, T1, the pixel at column C1 and row R4, (C1, R4) is read out. During a second readout cycle, T2, pixels at (C1, R3) and (C2, R4) are read out. During a third readout cycle, T3, pixels at (C1, R2), (C2, R3) and (C3, R4) are read out. Similarly, pixels in subsequent readout cycles are read out in a diagonal across the pixel array. Pixels may be output from the image sensing system so that the resultant image is at an angle relative to that as seen in FIG. 7B. By using this method of reading image data from an image sensor, fewer image processing steps may be required and/or less memory may be required to acquire a rotated resultant image in accordance with the teachings of the present invention.

Figure 8A:
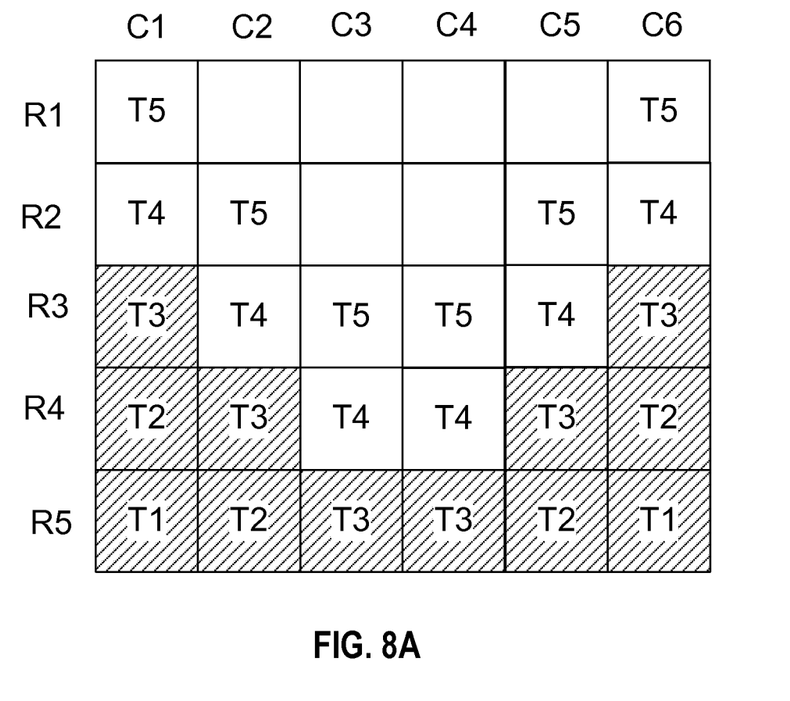
FIG. 8A is a diagram showing an example of a plurality of pixel cells included in an array of pixel cells that store image data of a distorted image captured with a fish eye lens, and are to be read out using techniques in accordance with the teachings of the present invention.
Figure 8B:
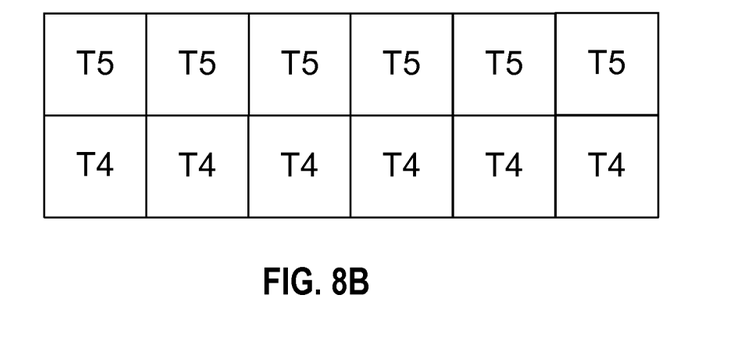
FIG. 8B is a diagram showing an example of a resulting image from a distorted image captured by a fish eye lens, which is read out from an array of pixel cells using techniques in accordance with the teachings of the present invention.

As previously mentioned, the method of reading image data from an image sensor as described in this disclosure may be applied to applications of correcting fish eye distortions. FIG. 8A is a diagram showing a simplified example pixel array 800, including 24 pixels arranged in columns C1 thru C5 and rows R1 thru R4. If a fish eye distorted image is captured in pixel array 800, some pixels in pixel array 800 will not contain image information, which could be read out of the pixel array, and discarded. Such pixels are represented by the shading in FIG. 8A. During a first readout cycle, T1, pixels at column 1, row 4 (C1, R5) and (C6, R5) are read out of pixel array 800, the image data from these particular pixels may be output from pixel array 800 and discarded, as these particular pixels do not contain image information because of the fish eye lens distortion. The image data output from pixel array 800 during a subsequent second and third readout cycle T2 and T3 respectively, are output from pixel array 800 and discarded, as these particular pixels do not contain image information as shown in FIG. 8A. It is not until a fourth (and subsequent) readout cycle, T4, when image data from pixels (C1, R2), (C2, R3), (C3, R4), (C4, R4), (C5, R3) and (C6, R2) are read from pixel array 800 and output in the resultant image as shown in FIG. 8B, which shows the result of readout cycles T4 and T5. Indeed, as shown in FIG. 8B, the fish eye lens distortion visible in the example shown in FIG. 8A is corrected in FIG. 8B by reading out the image data in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method of reading image data from an image sensor, comprising:
   accumulating image charges in photosensitive elements of an array of pixel cells arranged into a plurality of rows and a plurality of columns;
   transferring the image charges accumulated in each one of the photosensitive elements to a corresponding one of a plurality of transistors included in a corresponding one of a plurality of multi-phase transfer channels, wherein each one of the plurality of multi-phase transfer channels is coupled to a corresponding column of the array of pixel cells;
   generating a plurality of sets of multi-phase transfer signals, wherein each set of the multi-phase transfer signals includes a plurality of control signals that are out-of-phase with one another, wherein each one of the sets of multi-phase transfer signals is coupled to control the plurality of transistors of a respective one of the plurality of multi-phase transfer channels;
   selecting a first one of the plurality of columns;
   outputting the accumulated image charges from a first variable number of pixel cells of the selected first one of the plurality of columns in response to a first set of multi-phase transfer signals, wherein outputting the accumulated image charges from the first variable number of pixel cells of the selected first one of the plurality of columns comprises transferring the accumulated image charges transistor-to-transistor along a first one of the plurality of multi-phase transfer channels coupled to the selected first one of the plurality of columns in response to the first set of multi-phase transfer signals;
   selecting a second one of the plurality of columns; and
   outputting the accumulated image charges from a second variable number of pixel cells of the selected second one of the plurality of columns in response to a second set of multi-phase transfer signals.

2. The method of reading image data of claim 1 wherein the first and second variable number of pixel cells are greater than or equal to one.

3. The method of reading image data of claim 1 wherein the first and second variable number of pixel cells are not equal.

4. The method of reading image data of claim 1 wherein the first and second variable number of pixel cells are equal.

5. The method of reading image data of claim 1 wherein the plurality of transistors included in each one of the plurality of multi-phase transfer channels are coupled together in series.

6. The method of reading image data of claim 1 wherein outputting the accumulated image charges from the second variable number of pixel cells of the selected second one of the plurality of columns comprises transferring the accumulated image charges transistor-to-transistor along a second one of the plurality of multi-phase transfer channels coupled to the selected second one of the plurality of columns in response to the second set of multi-phase transfer signals.

7. The method of reading image data from the image sensor of claim 1 further comprising generating the image data in response to the output accumulated image charges.

8. The method of reading image data from the image sensor of claim 7 wherein generating the image data in response to the output accumulated image charges comprises amplifying signals responsive to the output accumulated image charges to generate the image data.

9. The method of reading image data of claim 7 further comprising reading out the image data from a readout circuit coupled to the plurality of multi-phase transfer channels.

10. The method of reading image data from the image sensor of claim 1 wherein said transferring the image charge accumulated in each one of the photosensitive elements to the corresponding one of the plurality of transistors included in the corresponding one of the plurality of multi-phase transfer channels comprises activating a transfer transistor in a corresponding pixel cell in response to a corresponding set of multi-phase transfer signals.

11. The method of reading image data from the image sensor of claim 1 wherein said transferring the image charge accumulated in each one of the photosensitive elements to the corresponding one of the plurality of transistors included in the corresponding one of the plurality of multi-phase transfer channels further comprises activating a transfer transistor and an output transistor in a corresponding pixel cell coupled to the corresponding one of the plurality of transistors included in the corresponding one of the plurality of multi-phase transfer channels.

12. The method of reading image data from the image sensor of claim 1 further comprising activating a global shutter, wherein the image charges are accumulated in the photosensitive elements of the array of pixel cells in response to the activation of the global shutter.

13. The method of reading image data from the image sensor of claim 1 wherein said accumulating image charges in photosensitive elements of the array of pixel cells comprises accumulating the image charges in a plurality of photosensitive elements in each one of the pixel cells of the array of pixel cells.

14. An image sensing system, comprising:
an array of pixel cells arranged into a plurality of rows and a plurality of columns;
a plurality of multi-phase transfer channels coupled to the array of pixel cells, wherein each one of the plurality of multi-phase transfer channels is coupled to a respective one of the plurality of columns of the array of pixel cells, wherein each one of the plurality of multi-phase transfer channels comprises a plurality of transistors coupled together in series, wherein each pixel cell of the respective one of the plurality of columns is coupled to a respective one of the plurality of transistors of a respective one of the plurality of multi-phase transfer channels;
readout circuitry coupled to the plurality of multi-phase transfer channels to readout image data from the array of pixel cells; and
column control circuitry coupled to generate multi-phase transfer signals coupled to be received by the plurality of multi-phase transfer channels to control an output of image data from a variable number of pixel cells for each one of the plurality of columns of the array of pixels, wherein each one of the plurality of multi-phase transfer channels is coupled to transfer the image data from the variable number of pixel cells for each one of the plurality of columns of the array of pixels to the readout circuitry in response to the multi-phase transfer signals, wherein image charges received from the variable number of pixel cells for each one of the plurality of columns of the array of pixels are coupled to be transferred through the respective one of the plurality of multi-phase transfer channels transistor-to-transistor along the plurality of transistors coupled together in series to the readout circuitry in response to the multi-phase transfer signals.

15. The image sensing system of claim 14 wherein the variable number of pixel cells for each one of the plurality of columns of the array of pixels is greater than or equal to one.

16. The image sensing system of claim 14 wherein the variable number of pixel cells for each one of the plurality of columns of the array of pixels is independent of other columns of the plurality of columns of the array of pixels.

17. The image sensing system of claim 14 wherein the readout circuitry comprises a plurality of column readout circuits coupled to the plurality of multi-phase transfer channels, wherein each one of the plurality of column readout circuits is coupled to output the image data received from a respective one of the plurality of multi-phase transfer channels.

18. The image sensing system of claim 17 wherein each one of the plurality of column readout circuits comprises a buffer circuit to output the image data received from the respective one of the plurality of multi-phase transfer channels.

19. The image sensing system of claim 17 wherein each one of the plurality of column readout circuits comprises an amplifier circuit to output the image data received from the respective one of the plurality of multi-phase transfer channels.

20. The image sensing system of claim 14 wherein each pixel cell of the array of pixel comprises:
a photosensitive element adapted to accumulate image charge in response to light incident upon the photosensitive element;
a global shutter transistor coupled to the photosensitive element to control accumulation of the image charge in the photosensitive element; and
a transfer transistor coupled between the photosensitive element and the a respective one of the plurality of multi-phase transfer channels to transfer the accumulated image charge from the photosensitive element to the respective one of the plurality of multi-phase transfer channels.

21. The image sensing system of claim 20 wherein the transfer transistor is coupled to be controlled in response to one of the multi-phase transfer signals.

22. The image sensing system of claim 20 wherein each pixel cell of the array of pixel further comprises an output transistor coupled between the transfer transistor and the respective one of the plurality of multi-phase transfer channels to transfer the accumulated image charge from the photosensitive element to the respective one of the plurality of multi-phase transfer channels.

23. The image sensing system of claim 20 wherein each pixel cell of the array of pixel further comprises:
a second photosensitive element adapted to accumulate image charge in response to light incident upon the photosensitive element; and
a second transfer transistor coupled between the second photosensitive element and the respective one of the plurality of multi-phase transfer channels to transfer the accumulated image charge from the second photosensitive element to the respective one of the plurality of multi-phase transfer channels, wherein the global shutter transistor is further coupled to the second photosensitive element to control accumulation of the image charge in the second photosensitive element.

* * * * *